(12) United States Patent  (10) Patent No.: US 7,850,117 B2
Lohwasser et al.  (45) Date of Patent: Dec. 14, 2010

(54) FUSELAGE STRUCTURE

(75) Inventors: Daniela Lohwasser, Berne (DE); Sven Werner, Buxtehude (DE); Andreas Behr, Bremen (DE); Christian Frank, Bremen (DE); Marco Pacchione, Hamburg (DE); Axel Bonde, Fredenbeck (DE); Christian Kulik, Osterholz-Scharmbeck (DE)

(73) Assignee: Airbus Deutschland GmbH (DE)

( * ) Notice: Subject to any disclaimer, the term of this patent is extended or adjusted under 35 U.S.C. 154(b) by 763 days.

(21) Appl. No.: 11/811,364

(22) Filed: Jun. 7, 2007

(65) Prior Publication Data
US 2008/0001033 A1    Jan. 3, 2008

Related U.S. Application Data

(60) Provisional application No. 60/812,536, filed on Jun. 9, 2006.

(30) Foreign Application Priority Data
Jun. 9, 2006   (DE) ...................... 10 2006 026 918

(51) Int. Cl.
B64C 1/00   (2006.01)

(52) U.S. Cl. ...................................... 244/119; 244/131

(58) Field of Classification Search ................. 244/119, 244/124, 131, 132, 123.8, 123.9
See application file for complete search history.

(56) References Cited

U.S. PATENT DOCUMENTS

| 5,518,208 | A | * | 5/1996 | Roseburg ..................... 244/132 |
| 5,649,888 | A | | 7/1997 | Micale et al. |
| 6,328,261 | B1 | * | 12/2001 | Wollaston et al. ............ 244/132 |
| 6,684,593 | B2 | | 2/2004 | Brenneis et al. |
| 2006/0065643 | A1 | * | 3/2006 | Hackius et al. ......... 219/121.64 |

FOREIGN PATENT DOCUMENTS

| CA | 2317366 | 3/2001 |
| DE | 100 07 995 C2 | 3/2002 |
| DE | 199 41 924 B4 | 7/2004 |
| DE | 103 32 003 B3 | 12/2004 |
| DE | 10 2004 035 170 B3 | 8/2005 |

\* cited by examiner

Primary Examiner—Tien Dinh
Assistant Examiner—Michael Kreiner
(74) Attorney, Agent, or Firm—Lerner, David, Littenberg, Krumholz & Mentlik, LLP

(57) ABSTRACT

A fuselage structure comprises a plurality of elements that in longitudinal direction are interconnected by weld joints; a plurality of circumferential ribs that are connected to the plurality of elements and that extend so as to be substantially perpendicular in relation to the longitudinal direction of the elements; and a plurality of clips that are arranged between the elements and the ribs such that said clips do not cover the respective weld joints.

7 Claims, 2 Drawing Sheets

FUSELAGE STRUCTURE

CROSS-REFERENCE TO RELATED APPLICATIONS

This application claims the benefit of the filing date of U.S. Provisional Patent Application No. 60/812,536 filed Jun. 9, 2006, the disclosure of which is hereby incorporated herein by reference.

BACKGROUND OF THE INVENTION

The invention relates to a fuselage structure, in particular to a fuselage structure for use in aircraft construction.

Present fuselage structures of conventional transport aircraft usually comprise stiffened panels that are reinforced by circumferential ribs (or frame elements), wherein the ribs (or frame elements) are connected to the fuselage shell by clips (shear clips). Usually clips are riveted to the aircraft shell, to the frame and in some cases to stringers. These clips are used to transfer loads between the aircraft shell and the rib.

In fuselage assembly, in future a welding method will be used to join fuselage panels in longitudinal direction. The weld joint can for example be a butt joint or an overlapping joint that replaces the conventional riveted overlapping connection. The region of the longitudinal connection, irrespective as to whether it is welded or riveted, has to be fastened to the rib with the use of a suitable clip.

However, the use of a conventional clip may not be suitable if fuselage panels in longitudinal direction are connected to the outer shell of an aircraft by welding. The conventional construction of the clips may mean that during the assembly of the outer shell of the fuselage the clips and ribs are installed by rivets in all locations that are positioned away from the longitudinal seams of the panels. The stiffened outer shell or the panels are then connected in longitudinal direction by a suitable welding technique. After welding, the clip is installed in the weld region. This may result in a less than optimal manufacturing sequence because it may be necessary to carry out the riveting procedure twice.

Furthermore in the conventional construction of the clips the weld seam may not be accessible to perform local surface treatment (e.g. corrosion protection). It may be necessary to perform surface treatment of the weld seam before the clips are installed in the weld region. The fuselage panels may have to be protected against corrosion and, by suitable surface treatment, may have to be prepared for varnishing. Surface treatment may have to be performed before the ribs and the clips are installed; however, global treatment of the weld surface may have to take place only after welding. Riveting, welding and surface treatment may thus be separate manufacturing steps so that in the case of the conventional construction of the clips it may be necessary to alternate between these steps, which is time consuming and costly.

SUMMARY OF THE INVENTION

The fuselage structure according to an exemplary embodiment of the invention comprises a plurality of elements that are interconnected in longitudinal direction by weld joints. The fuselage structure further comprises a plurality of circumferential ribs that are connected to the plurality of elements and that extend substantially perpendicular in relation to the longitudinal direction of the elements, wherein a plurality of clips are arranged between the elements and the ribs such that the respective weld joints on the elements are not covered.

According to an exemplary embodiment of the invention, the fuselage structure further comprises a plurality of stringers that are connected to the rib by way of a separate angle element.

According to a further exemplary embodiment of the invention, each clip in the weld region is arranged between two stringers, wherein one end region of each clip is connected to a corresponding element, and another end region of each clip is connected to a corresponding rib. Optionally, one end region comprises an additional angle in order to reinforce the connection between the clip and the corresponding element.

According to another exemplary embodiment of the invention, the end region of each clip comprises a recess through which a corresponding weld joint of the elements extends.

According to a further exemplary embodiment of the invention, the clips, the ribs and the stringers are connected to each other by rivets.

The fuselage structure according to the invention may provide that the fuselage shell and the frames are connected to each other by way of the clip such that the weld surface remains completely accessible when the clip is installed, and that the fuselage panels can be welded together with the clips already pre-installed. Thus, global surface treatment may be performed prior to welding. This is followed by the installation of all riveted and bonded connections including the element described in this document. After welding, surface treatment in the weld region may then be performed. Furthermore, surface treatment of the weld seam may be performed with the clips already installed. Furthermore, an easier detection of any damage, and simpler repair may be provided, e.g. it may be possible to repair the longitudinal joints (weld seams) without having to remove the clips. Furthermore, a simplified access during inspection may be provided, e.g. in order to find any fatigue cracks, and simplification of repairs in the region covered by the invention, i.e. the weld seam, without the necessity of deinstalling the pre-installed clips.

BRIEF DESCRIPTION OF THE DRAWINGS

Below, exemplary embodiments of the invention are described with reference to the enclosed drawings.

In the figures, identical or corresponding elements have the same reference numbers in the various views.

DETAILED DESCRIPTION

Figure 1:
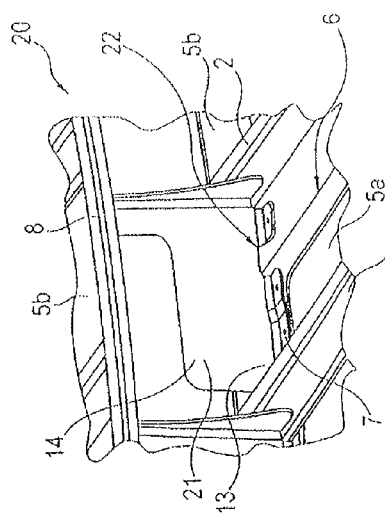
FIG. 1 shows a partial view of a fuselage structure, showing a clip according to prior art.

FIG. 1 shows a partial view of a fuselage structure according to prior art.

The fuselage structure 1 comprises a fuselage shell 4, which by way of a clip 3 is connected to the rib 8. Stringers 2, which for the purpose of stabilisation have been riveted to the clip 3, preferably extend parallel in relation to each other; they are used to stiffen the fuselage shell 4. Said fuselage shell 4 usually comprises a plurality of panels 5a, b, that are interconnected by a weld seam 6 that extends in longitudinal direction.

As is shown in FIG. 1, the clip 3 has been attached to the fuselage shell 4 by rivets 7, wherein the weld seam 6 is partly covered by the clip 3.

As is shown in FIG. 1, the outer shell 4 of the fuselage is connected to a circumferential rib 8 by way of the clip 3.

Figure 2A:
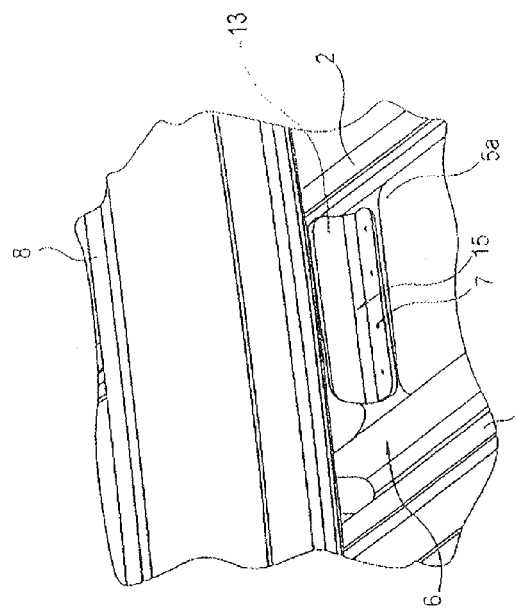
FIG. 2A shows a partial view of a fuselage structure according to a first exemplary embodiment of the invention, from the front.
Figure 2B:
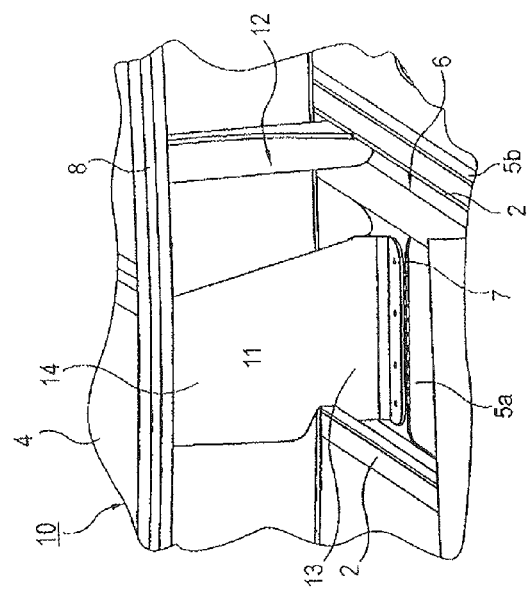
FIG. 2B shows a partial view of a fuselage structure according to the first exemplary embodiment of the invention, from the rear.

FIGS. 2A and 2B show partial views of a fuselage structure 10 according to a first exemplary embodiment of the invention from the front FIG. 2A) and from the rear (FIG. 2B).

The fuselage structure according to the first exemplary embodiment comprises stringers 2 that extend substantially parallel in relation to each other. Between the stringers 2 a clip 11 is arranged, which extends substantially perpendicular in relation to the longitudinal direction of the stringers 2, and which clip 11 connects the (shell) panels 5a to the rib 8.

As is shown in FIGS. 2A and 2B, the clip 11 is preferably attached by rivets 7 to a fuselage shell 4 that comprises a plurality of panels 5a, b, which are welded together in longitudinal direction. FIGS. 2A and 2B show a weld seam 6 that extends in longitudinal direction, which weld seam 6 extends substantially parallel in relation to the stringers 2. As is shown in FIG. 2A, the clip 11 is arranged such that the weld seam remains exposed and is not covered by the clip 11. Furthermore, the clip is only connected to the panel 5a so that it can be mounted before the panels 5a and 5b are connected to each other. By riveting the clips 11 to the panel 5a only, it is possible to mount the clip prior to welding together the panels 5a and 5b.

According to the first exemplary embodiment of the invention, the stringer positioned nearer to the weld seam 6 is attached to a rib 8 by an angle 12 so as to stabilize the stringers, wherein the rib 8 is in connection with the fuselage shell 4 (and panel 5a, respectively) by way of the clip 11. The clip 11 extends substantially perpendicularly from the panel 5a in the direction of the rib 8.

One end region 13 of the clip 11 is connected to the panel 5a by way of the rivets 7, wherein another end region 14 of the clip 11 is connected to the rib 8, for example by rivets or some other suitable connection system.

As FIG. 2B shows, on the end region 13 of the clip 11 an angle element 15 is arranged, which is connected by rivets 7 to the aircraft panels 5a or to the same panel to which clip 11 is also connected. The angle element 15 extends between the stringers 2 such that the weld seam 6 remains exposed. This angle element is optional; its presence depends on the load structure so as to compensate for the fact that the new design of the clip has a smaller connection region to the outer shell of the aircraft. The new clip design results in a shorter length between the clip and the shell and the rib respectively. Due to the shorter length, less force may be transferred. This is to be compensated for by the second angle.

Figure 3:
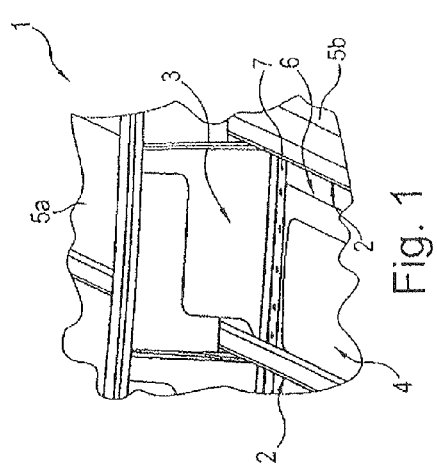
FIG. 3 shows a partial view of a fuselage structure according to a second exemplary embodiment of the invention.

FIG. 3 shows a fuselage structure 20 according to a second exemplary embodiment of the invention. The fuselage structure 20 according to the second exemplary embodiment differs from the fuselage structure according to the first exemplary embodiment among other things by the design of the clip 21.

The remaining elements shown in FIG. 3 correspond to the elements according to the first exemplary embodiment and are not described anew.

As is shown in FIG. 3, the clip 21 extends between the stringers 2 such that the webs of the stringers 2 are contacted, wherein each clip is connected to only one stringer 2, and the clip does not interconnect the stringers 2. The clip 21 comprises a recess 22, wherein the longitudinally extending weld seam 6 extends through the recess 22. According to this exemplary embodiment it may not be necessary to provide an angle in order to connect the stringer 2, which rests against the weld seam 6, to the frame.

In a manner similar to that in the case of clip 11, in the case of clip 21 it may be possible to perform welding and any surface treatment of the weld seam after the clips have been installed.

Figure 4:
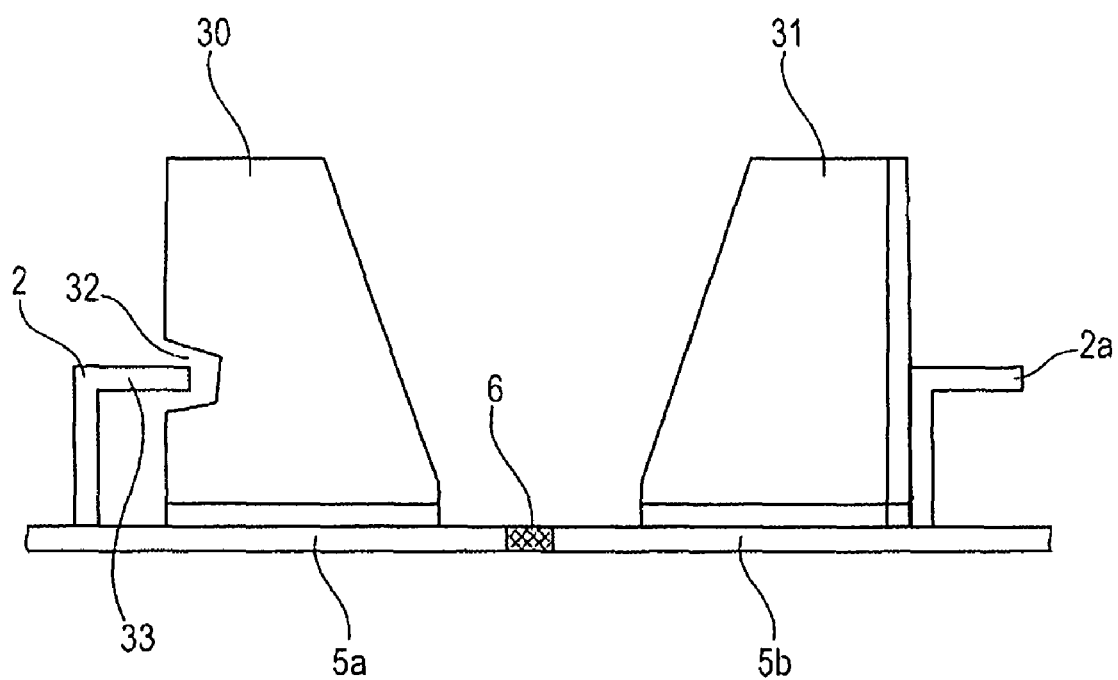
FIG. 4 shows a diagrammatic detail view of a fuselage structure according to a third exemplary embodiment.

FIG. 4 shows a diagrammatic detail view of a fuselage structure according to a third exemplary embodiment.

According to the third exemplary embodiment, two clips 30, 31 are provided. As is shown in FIG. 4, the clip 30 is connected to the panel 5a. The clip 30 comprises a recess 32 into which an angled region 33 of the stringer 2 protrudes.

The clip 31 according to the third exemplary embodiment is connected to the stringer 2a and to the panel 5b. As is shown in the figure, a weld seam 6, which interconnects the panels 5a and 5b, is covered neither by the clip 5a nor by the clip 5b so that the same advantages are achieved as described above with reference to the first and second exemplary embodiments. FIG. 4 does not show any ribs 8.

Although, the invention has been described above with reference to preferred exemplary embodiments, it is understood that this is merely by way of an example rather than being limiting. For example, the clips 11, 21 according to the first and the second exemplary embodiment may be arranged only at positions where two aircraft panels are welded together. In the remaining regions between the stringers, conventional clips 3 may be used in order to connect the fuselage shell to the rib.

Furthermore, although the invention has been described with reference to an aircraft fuselage, it is understood that the invention may also be used in other fields of application, for example in shipbuilding.

In addition, it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other features or steps of other exemplary embodiments described above. Reference numbers in the claims are not to be interpreted as limitations.

The invention claimed is:

1. A fuselage structure comprising
   a plurality of fuselage panels that in longitudinal direction are interconnected by weld joints;
   a plurality of circumferential ribs that are connected to the plurality of fuselage panels and that extend substantially perpendicular in relation to the longitudinal direction of the fuselage panels; and
   a plurality of clips that are arranged between the fuselage panels and the ribs in the region of the weld joints such that the clips do not cover the respective weld joints; wherein each clip is attached to two adjacent fuselage panels such that each clip spans the weld joint of the two adjacent fuselage panels but does not contact the weld joint of the two adjacent fuselage panels
   wherein the clips are installed to the fuselage panels such that the weld surface remains completely accessible when the clips are installed, so that the fuselage panels can be welded together with the clips pre-installed.

2. The fuselage structure of claim 1, further comprising a plurality of stringers that are connected to the rib by way of a separate angle element.

3. The fuselage structure of claim 2, wherein each clip is arranged between two stringers, wherein one end region of each clip is connected to a corresponding fuselage panel, and another end region of each clip is connected to a corresponding rib.

4. The fuselage structure of claim 3, wherein one end region comprises an additional angle in order to additionally connect the clip to the corresponding fuselage panel.

5. The fuselage structure of claim 1, wherein the end region of each clip comprises a recess through which a corresponding weld joint extends.

6. The fuselage structure of claim 1, wherein the clips, the ribs, and the stringers are connected to each other by rivets.

7. A method of assembling a fuselage structure according to claim 1, the method comprising the steps:

prior to welding the fuselage panels together.

* * * * *

UNITED STATES PATENT AND TRADEMARK OFFICE
CERTIFICATE OF CORRECTION

| | | |
|---|---|---|
| PATENT NO. | : 7,850,117 B2 | Page 1 of 1 |
| APPLICATION NO. | : 11/811364 | |
| DATED | : December 14, 2010 | |
| INVENTOR(S) | : Daniela Lohwasser et al. | |

It is certified that error appears in the above-identified patent and that said Letters Patent is hereby corrected as shown below:

Col. 3, line 11, insert --(-- before "FIG. 2A)"

Col. 4, line 58, insert --.-- after "fuselage panels"

Col. 4, line 63, starting at line 59, delete "wherein the clips are installed to the fuselage panels such that the weld surface remains completely accessible when the clips are installed, so that the fuselage panels can be welded together with the clips pre-installed."

Col. 6, line 4, "steps" should read --step--

Col. 6, line 5, insert --installing the clips-- before "prior to welding"

Signed and Sealed this
Twelfth Day of April, 2011

David J. Kappos
*Director of the United States Patent and Trademark Office*